United States Patent
Evans

(10) Patent No.: US 6,629,720 B1
(45) Date of Patent: Oct. 7, 2003

(54) SYSTEM FOR BRACING DISABLED TRAILERS, CLAMP THEREFOR AND METHOD

(76) Inventor: Fraser Evans, 2035 Fletcher Road, Binbrook, Ontario (CA), L0R 1C0

( * ) Notice: Subject to any disclaimer, the term of this patent is extended or adjusted under 35 U.S.C. 154(b) by 132 days.

(21) Appl. No.: 09/973,507

(22) Filed: Oct. 9, 2001

(51) Int. Cl.[7] .............................................. B62D 21/00
(52) U.S. Cl. ..................... 296/181; 296/30; 403/322.1; 24/514; 24/525; 280/789
(58) Field of Search ................................ 280/781, 785, 280/789, 204, 423.1; 180/311; 403/373, 374.1, 374.2, 374.3, 374.4, 321, 322.1, 322.3; 24/514, 525; 296/29, 30, 181, 182

(56) References Cited

U.S. PATENT DOCUMENTS

| | | |
|---|---|---|
| 1,797,530 A | 3/1931 | Mayer |
| 2,346,130 A * | 4/1944 | Evans ........................ 280/424 |
| 2,903,776 A | 9/1959 | Roberts |
| 3,346,224 A * | 10/1967 | Rollins ........................ 410/64 |
| 3,469,810 A * | 9/1969 | Dorris ..................... 248/228.3 |
| 3,736,629 A | 6/1973 | Blake |
| 3,967,743 A | 7/1976 | Yoder |
| 4,024,821 A | 5/1977 | Yang |
| 4,065,892 A | 1/1978 | Lawrence |
| 4,371,203 A | 2/1983 | Munro |
| 4,541,155 A | 9/1985 | Gagnon |
| 4,563,109 A * | 1/1986 | Ortemond ................ 405/195.1 |
| 4,570,967 A | 2/1986 | Allnutt |
| 4,619,447 A | 10/1986 | Blake |
| 4,761,031 A | 8/1988 | Rowe et al. |
| 4,988,115 A * | 1/1991 | Steinke ....................... 280/404 |
| 5,028,072 A | 7/1991 | Lindsay |
| 5,205,587 A | 4/1993 | Orr |
| 5,809,623 A | 9/1998 | Dykstra |
| 5,839,760 A | 11/1998 | Johnson |
| 5,992,121 A * | 11/1999 | Lindsay ....................... 52/690 |
| 6,047,989 A * | 4/2000 | Wood ......................... 280/789 |
| 6,053,567 A | 4/2000 | Ito |

* cited by examiner

Primary Examiner—Paul N. Dickson
Assistant Examiner—Laura B. Rosenberg
(74) Attorney, Agent, or Firm—Young & Basile P.C.

(57) ABSTRACT

An I-beam clamp comprises a body having a seat and defining a medial plane extending through and perpendicular to the seat and a normal plane aligned with the seat; a pair of pads mounted to the body for movement between respective closed positions beyond the seat, on opposite sides of and in spaced relation to the medial plane and in spaced relation to the normal plane, and open positions, whereat each pad is disposed, relative to its closed position, in a direction away from both the normal plane and the medial plane; and an actuator for effecting movement of the pads between their closed positions and their open positions. Clamp pairs can be secured to a disabled trailer undercarriage and a brace can be disposed between each pair. A saddle can be secured to each pair to urge the brace towards the undercarriage and support same for towing.

7 Claims, 8 Drawing Sheets

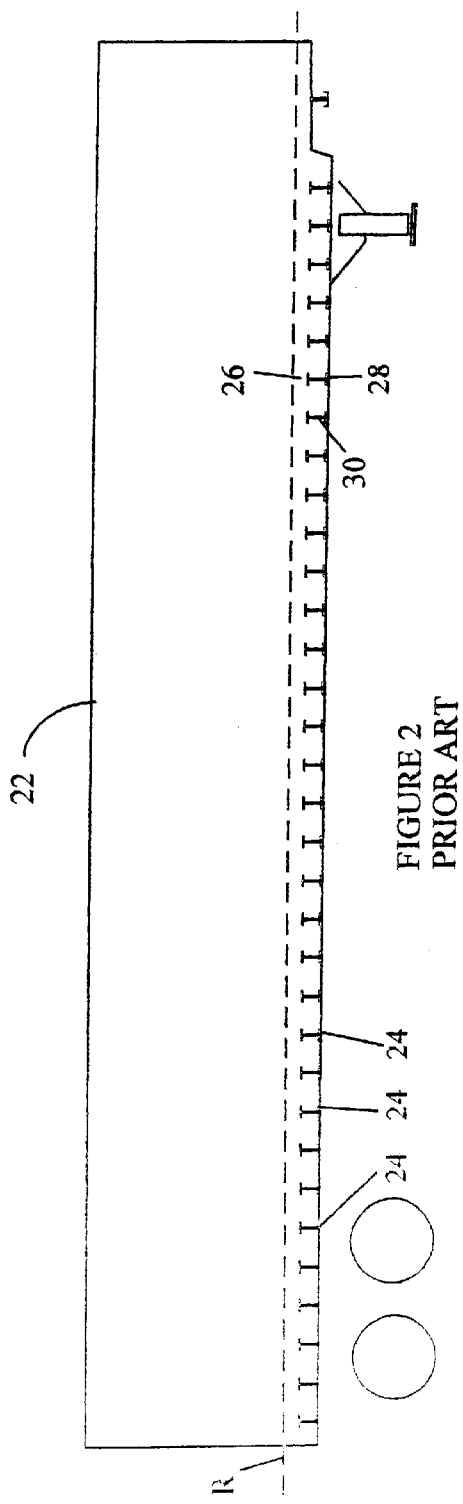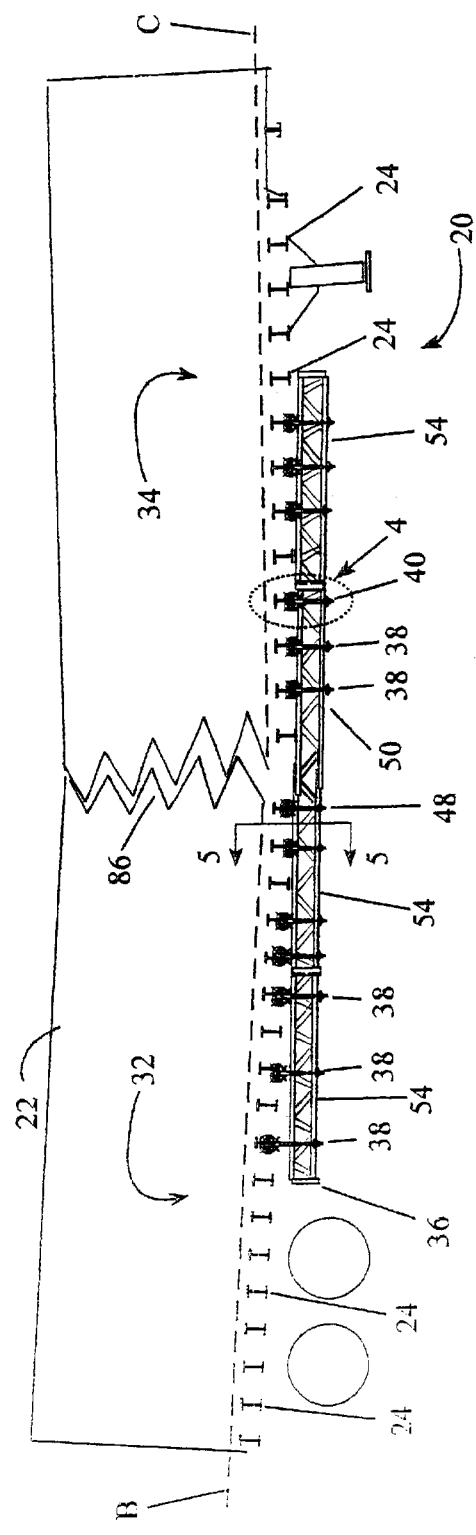
FIGURE 2
PRIOR ART
FIGURE 3

SYSTEM FOR BRACING DISABLED TRAILERS, CLAMP THEREFOR AND METHOD

FIELD OF THE INVENTION

The present invention relates to the field of vehicular towing, and more particularly, to a clamp apparatus having utility as a component in a system for bracing disabled highway box trailers, for subsequent towing.

BACKGROUND OF THE INVENTION

Highway box trailers, which are sometimes referred to as van trailers, often have a unit body construction. That is, highway box trailers are often constructed without a spine or brace member extending the length of the chassis for primary support, and instead rely largely upon the box portion of the structure to be self-supporting.

These unit body box trailers are known in the transportation industry to be relatively durable and useful. However, this type of trailer, lacking a rigid spine, can be susceptible to structural failure in the event of a collision or even improper loading. Once this occurs, government regulations in many jurisdictions impose severe limitations on the manner in which same may be transported.

One class of unit body box trailer is characterized by an undercarriage comprising a plurality of exposed laterally-extending cross-members disposed in substantially parallel relation, each of said cross-members having an upper flange, a lower flange disposed beneath the upper flange and aligned parallel thereto and a central web extending between and connecting the upper flange and the lower flange.

It is known in the prior art to structurally reinforce trailers of this class by providing an I beam or similar brace member beneath the undercarriage, and connecting same, by welding or the like, to the lower flanges of some or all of the cross-members. However, this step can be time-consuming, and can require specialized equipment, such as welding equipment.

In an attempt to overcome the need for specialized equipment, it is also known in the prior art to provide a separate brace member beneath the undercarriage of a trailer, and to connect same, by clamps, to the lower flanges of some or all of the trailer cross-members. U.S. Pat. No. 1,797,530 (Mayer), issued Mar. 31, 1931 is exemplary in this regard. However, while this structure obviates the need evidenced in the prior art for specialized tools, it necessitates, such that the I-beam brace can be brought into position against the undercarriage, that the undercarriage be substantially planar, whereas disabled unit body box trailers typically exhibit a sagging of the undercarriage. When located on uneven or unstable surfaces, such as the shoulder of a road, as is often the case in the context of a collision, the difficulties of jacking the mid portion of the trailer to straighten same can be practically insurmountable, thereby limiting the utility of the Mayer structure as a bracing system for disabled trailers.

SUMMARY OF THE INVENTION

It is an object of the present invention to provide a novel system for bracing disabled box trailers.

This object is addressed by the present invention, comprising a system for bracing disabled box trailers for subsequent towing, a clamp therefor and a method for bracing disabled box trailers for subsequent towing.

The system is for bracing disabled box trailer of the type having an exposed undercarriage comprising a plurality of laterally-extending I beam cross-members spaced-apart from one another in substantially side-by-side parallel relation, each cross-member having a first flange, a second flange spaced beneath and parallel to the first flange and a central web extending between and connecting the first flange and the second flange, said plurality of I-beam cross-members comprising a first grouping of I-beam cross-members collectively defining a first plane and a second grouping of I-beam cross-members collectively defining a second plane disposed in angular relation to the first plane. The system comprises a brace member disposed beneath and spanning between at least two of the cross-members of the first grouping and at least one of the cross-members of the second grouping and arranged substantially transversely to the cross-members. Also provided is a clamping assembly for each of said at least two cross-members of the first grouping and associated therewith and for each of said at least one cross-member of the second grouping and associated therewith. Each clamping assembly is selectively, releasably connected to its respective cross-member. Additionally, a connection mechanism selectively, releasably connecting the brace member to each clamping assembly to support the undercarriage as against sagging, for subsequent towing, is provided.

Preferably, the clamping assembly comprises a pair of clamp apparatus which are selectively, releasably connected to the cross-member associated with the clamping assembly of which the clamp apparatus together form part, and which are disposed on respective sides of the brace member to restrain same as against lateral movement.

The connection means preferably comprises, for each clamping assembly, a saddle member positioned beneath and urging the underside of the brace member towards the cross-member associated with each clamping assembly and releasably connected to the pair of clamp apparatus by bolts.

The brace member preferably comprises a plurality of brace segments, each defining a longitudinal axis extending between respective ends, these brace segments being rigidly, releasably connectable to one another, in substantially end-to-end relation, with their respective axes parallel and offset.

The clamp apparatus preferably comprises a main body member. The main body member terminates in a substantially planar seat portion and defines a medial plane which extends through the seat portion and is arranged perpendicular thereto. The main body member further defines a normal plane which is aligned with the seat portion. A pair of pad portions is also provided, comprising a first pad portion and a second pad portion. A mounting means is provided for mounting the pad portions to the main body member for movement between respective closed positions, whereat the pad portions are located beyond the terminus of the main body member; on opposite sides of and in spaced relation to the medial plane and in spaced, substantially equidistant relation to the normal plane, and respective open positions, whereat the first pad portion is disposed, relative to its respective closed position, in a direction away from the normal plane, and the second pad portion is disposed, relative to its respective closed position, in a direction away from both the medial plane and the normal plane. Also provided is an actuation means for affecting selective movement of the pad portions between their respective closed positions and their respective open positions.

Preferably, in its respective open position, the first pad portion is disposed, relative to its respective closed position, in a direction away from both the medial plane and the normal plane.

According to a further aspect of this invention, a clamping apparatus for clamping a structural member comprises a central, main body member having an upper end forming a seat portion; first and second pad portions for engaging said structural member; and first and second movable arms on which said first and second pad portions are respectively mounted. Each arm is movably connected to the main body member and located on a side of said main body member opposite to the side on which the other arm is mounted. Further, each arm is movable from a closed position where its respective pad portion is located beyond said seat portion to an open position where the pad portion is disposed further away from said seat portion than in its closed position. Also provided is an actuation arrangement for affecting movement of each arm between the closed and open positions of the respective arm. In the open position, said arms and their respective pad portions can be placed around a portion of said structural member, and in said closed position, said portion of said structural member is clamped between said pad portions and said seat portion.

The method of the invention comprises the steps of positioning a brace member beneath and spanning between at least two of the cross-members of the first grouping and at least one of the cross-members of the second grouping and in substantially transverse arrangement thereto; selectively, releasably connecting a clamping assembly to each of the at least two cross-members of the first grouping and to each of the at least one cross-members of the second grouping; and selectively, releasably connecting the brace member to each clamping assembly.

Other advantages, features and characteristics of the present invention, as well as methods of operation and functions of the related elements of the structure, will become more apparent upon consideration of the following description with reference to the accompanying drawings, the latter of which is briefly described hereinbelow.

BRIEF DESCRIPTION OF THE DRAWINGS

FIG. 2 is a side cross-sectional view of a trailer structure of the prior art;

FIG. 3 is a view similar to FIG. 2, showing a bracing system according to a preferred embodiment of the present invention in use with a disabled box trailer;

DETAILED DESCRIPTION OF THE PREFERRED EMBODIMENT

Figure 1:
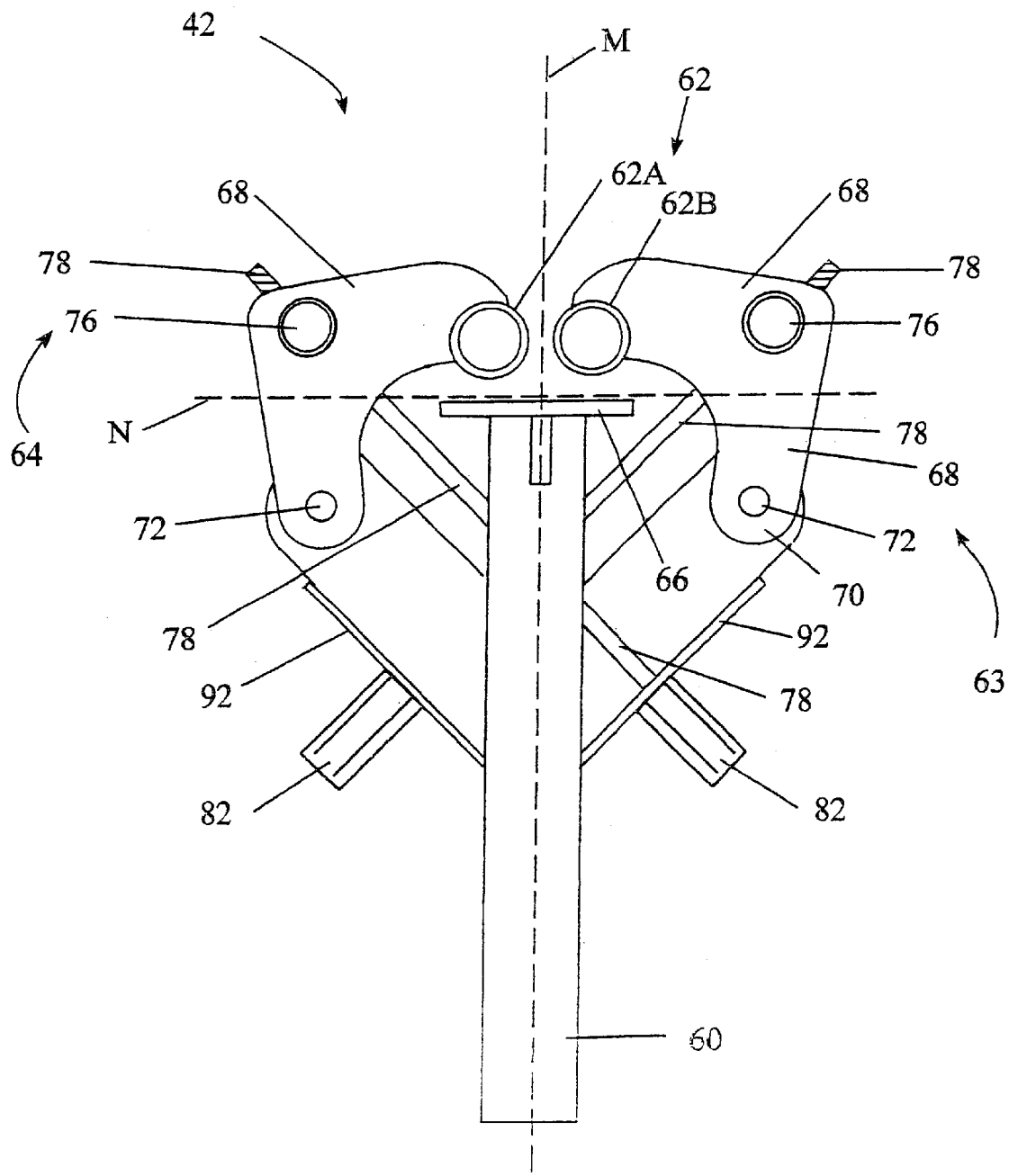
FIG. 1 is a side view of a clamp apparatus according to a preferred embodiment of the present invention.

With general reference to FIG. 3, a bracing system 20 according to a preferred embodiment of the present invention is illustrated in use with a disabled box trailer 22. For greater certainty, the trailer 22 does not form part of the invention.

As best illustrated in FIG. 2, the prior art trailer 22 with which the invention is utilized is of a type common in the trucking industry, characterized by an exposed undercarriage comprising a plurality of laterally-extending I-beam cross-members 24 spaced-apart from one another in substantially side-by-side parallel relation. Each cross-member 24 has a first flange 26, a second flange 28 spaced beneath and parallel to the first flange and a central web 30 extending between and connecting the first flange 26 and the second flange 28.

As built, the cross-members 24 of this type of trailer 22 are arranged in substantially planar relation, as seen in FIG. 2, wherein the cross-members 24 are shown in alignment with reference plane R. However, once structural integrity has been compromised, the geometric stability of the structure, and particularly, the planar alignment of the cross-members 24 thereof is often not maintained. In such circumstances, the cross-members 24 will take on an alternative arrangement, which for ease of reference only may be considered to comprise a first grouping 32 of I-beam cross-members collectively defining a first plane B and a second grouping 34 of I-beam cross-members collectively defining a second plane C disposed in angular relation to the first plane B, as illustrated in FIG. 3. Of course, it will be understood by persons of ordinary skill in the art that the cross-members respectively comprising the first grouping 32 and the second grouping 34 will not always be in perfect planar alignment; that additional planar groupings of cross-members are possible; and that the relative location of the "fracture"(defined by the junction of the planes, and designated with reference numeral 86 in FIG. 3) and the alignments of the planes illustrated is only exemplary, and that the actual fracture point and plane alignments will vary greatly. For clarity in this regard, a further exemplary illustration of the preferred brace system in combination with a disabled trailer taking a different geometry is provided as FIG. 9.

As seen in FIG. 3, the preferred bracing system of the present invention 20 comprises a brace member 36. The brace member 36 is disposed beneath and spans between at least two of the cross-members 24 of the first grouping 32 and at least one of the cross-members 24 of the second grouping 34 and is arranged substantially transversely to these cross-members 24.

Also provided is a plurality of clamping assemblies 38 for the aforementioned at least two cross-members 24 of the first grouping 32 and at least one cross-member 24 of the second grouping 34. These clamping assemblies 38 are selectively, releasably connected to each of said at least two cross-members 24 of the first grouping 32 and to each of said at least one of the cross-members 24 of the second grouping 34.

Additionally, a connection means or mechanism 40, discussed more fully in following paragraphs, selectively, releasably connects the brace member 36 to each clamping assembly 38 to support the undercarriage as against sagging, for subsequent towing. In any given application, factors including the load carried by the trailer, the distribution of that load, the location of the "fracture", and the mechanical strength of the brace and clamp assemblies will impact upon the actual number of cross-members on either side of the fracture that must be spanned by the brace and the number and location of the clamp assemblies that must be utilized.

Calculations in this regard are obvious to persons of ordinary skill in the art, and shall not be detailed herein. For greater certainty, it is not essential to the invention that clamping assemblies be provided for every cross-member that is spanned by the brace.

Each clamping assembly 38 is associated with the cross-member 24 to which it is selectively, releasably connected in use. However, it should be understood that all clamping assemblies 38 are identical, and can be utilized for connection to any of the other cross-members 24 of the trailer 22 equally as well as that with which it is associated in any given use.

Figure 4:
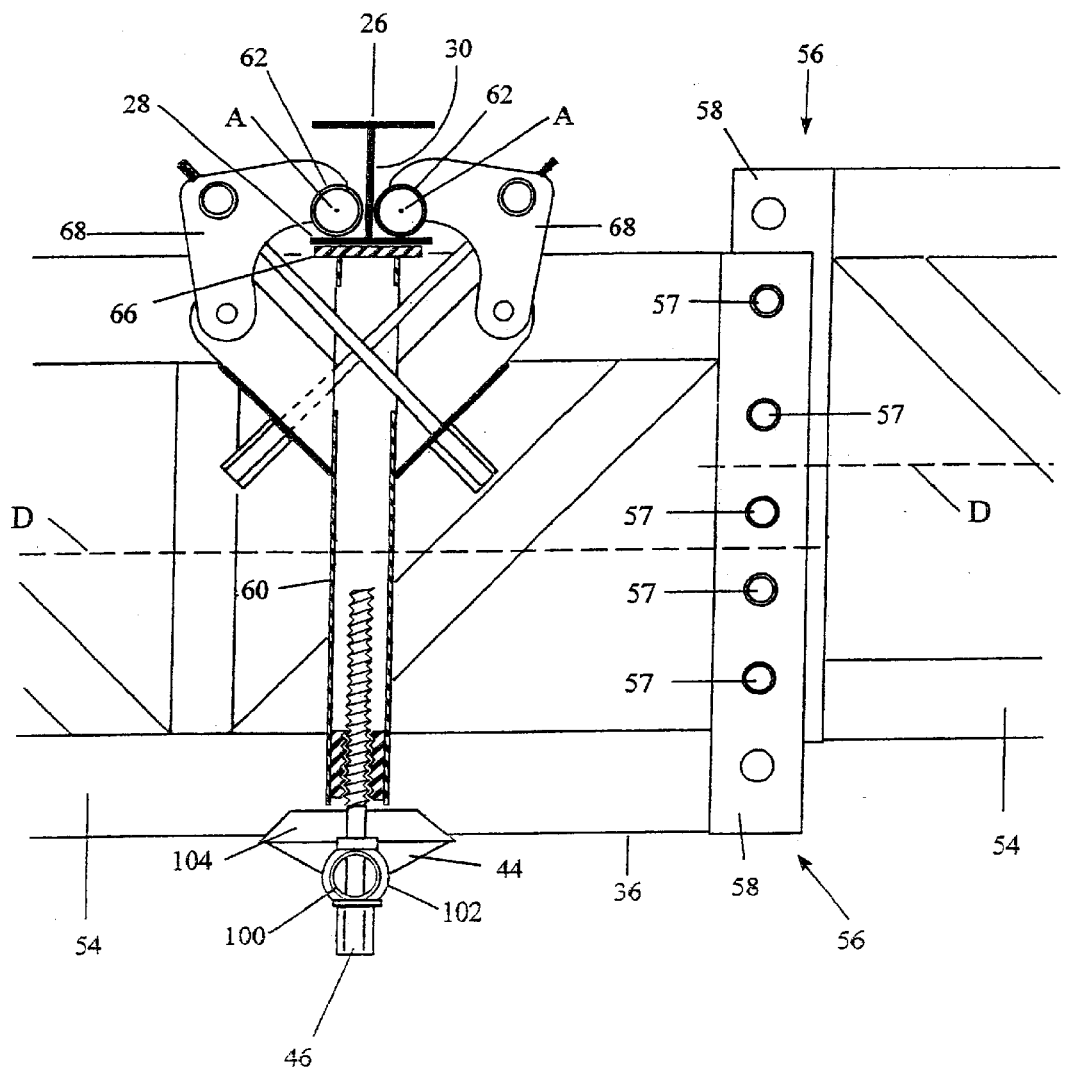
FIG. 4 is an enlarged view of the encircled area 4 in FIG. 3, with portions of the clamp apparatus removed for clarity.
Figure 5:
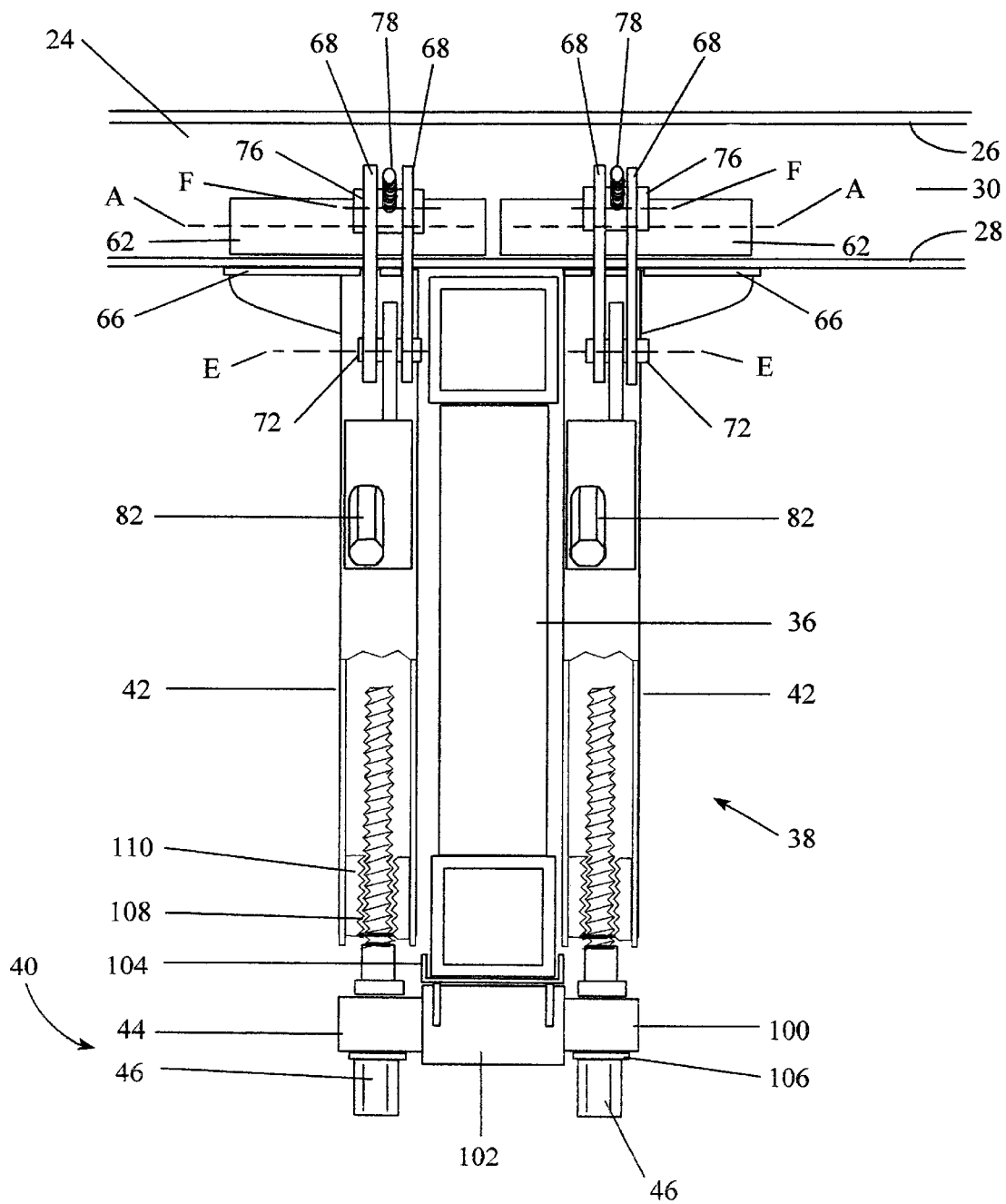
FIG. 5 is a cross-sectional view taken along line 5—5 in FIG. 3, with portions of the clamp apparatus removed for clarity.

As best illustrated in FIGS. 4 and 5, the preferred clamping assembly 38 comprises a pair of clamp apparatus 42 which are selectively, releasably connected to the cross-member 24 associated with the clamping assembly 38. The clamp apparatus 42 together form part of this clamping assembly 38, and are disposed on respective lateral sides of the brace member 36 to restrain the brace member 36 as against lateral movement.

The connection mechanism 40 comprises, for each clamping assembly 38, a saddle member 44 urging the underside of the brace member 36 towards the cross-member 24 and releasably connected to the pair of clamp apparatus 42 by bolts 46.

The saddle member 44 preferably comprises an inner tubular member 100 disposed concentrically for rotation within an outer tubular member 102. The bolts 46 pass through holes formed at opposite ends of the inner tubular member 100, and engage within threaded sockets 108 provided in the clamp apparatus 42. A channel member 104 is rigidly connected to the outer tubular member 102, and is shaped and dimensioned to receive therewithin an edge of the brace member 36. Washers 106 are provided about the inner tubular member 100 to reduce physical wear between the bolts 46 and the inner tubular member 100. It will be evident that the preferred embodiment of the saddle member 44 allows for rotation of the channel member 104 about the inner tubular member 100, which permits the channel member 104 to engage flushly against the lower extent of the brace member 36.

It should be noted at this time that, depending upon the location of the clamping assembly 38, the saddle member 44 may or may not urge the brace member 36 against the cross-member 24. In FIG. 3, for example, only clamping assemblies 48 and 50 urge the brace member 36 against the cross-member 24.

Figure 9:
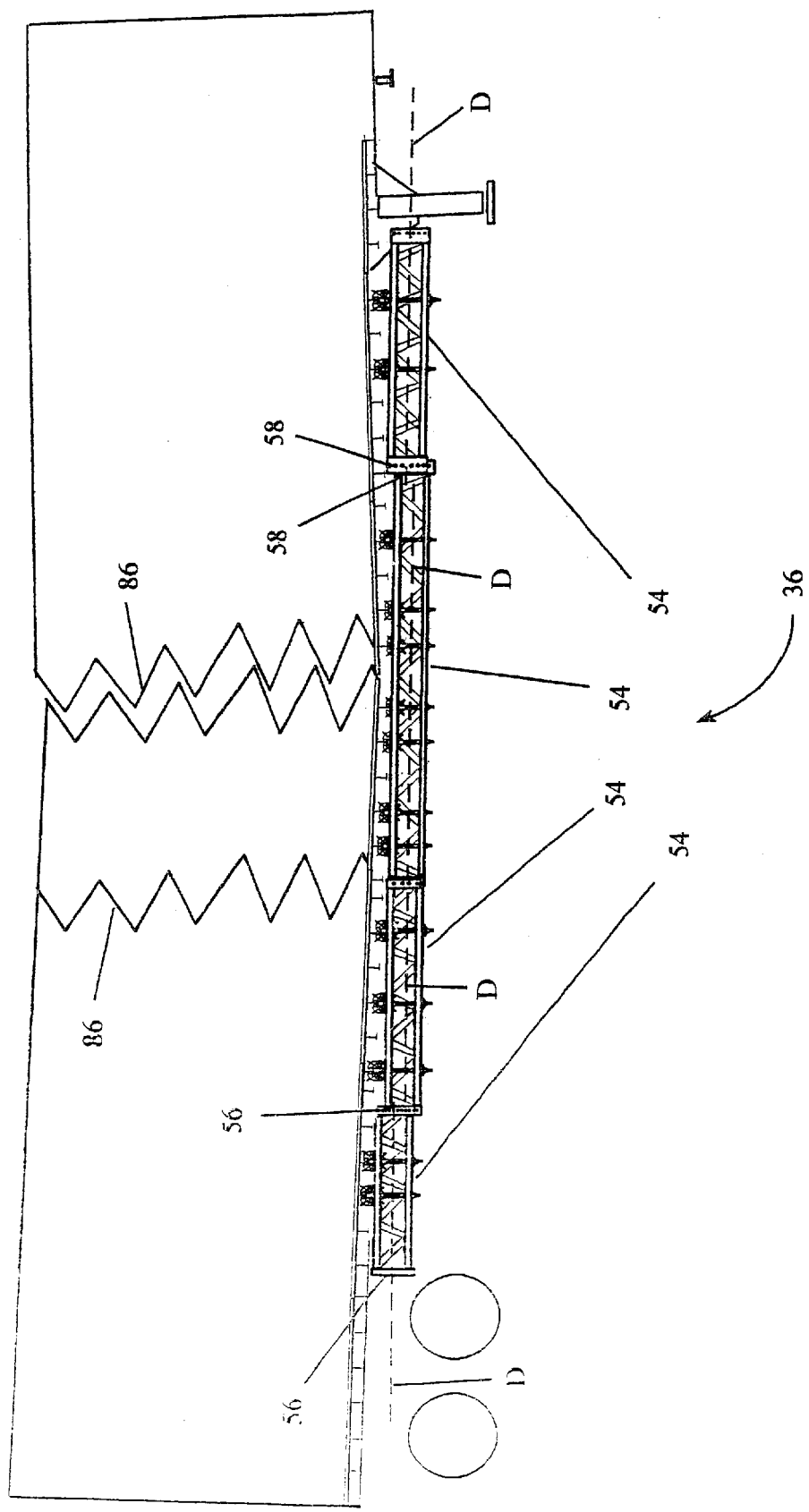
FIG. 9 is a view similar to FIG. 3.

Irrespective of whether the clamping assembly 38 urges the brace member 36 against the cross-member 24 or simply towards the cross-member 24, the desired support of the undercarriage is achieved. It is, however, ideal to minimize the clearance between the brace member 36 and the cross-members 24 to provide maximum rigidity in the aggregate structure. Accordingly, the brace member 36 of the preferred embodiment is of segmented construction, comprising a plurality of brace segments 54, connected in substantially end-to-end relation. As seen in FIGS. 4 and 9, each brace segment 54 defines an axis D extending between the ends 56,56 of the segment 54, and the ends 56 are provided with bracket means 58 that allow for end-to-end rigid connection of the segments 54, by pins 57 or the like, with the axes D of abutting segments being in parallel, offset relation. As illustrated in FIG. 9, this structure allows the brace member 36 to generally follow the shape of the undercarriage, thereby to effect the desired minimization of clearance.

The preferred clamp apparatus 42 of the present invention will now be more particularly described with general reference to FIGS. 1, 5–8 and 10, and will be seen to comprise a main body member 60, a pair of pad portions 62, a mounting means 63 and an actuation means 64, all of which as further described hereinafter.

As illustrated in FIGS. 1 and 4, the main body member 60 terminates in a substantially planar seat portion 66 which, in use, abuts the underside of the second flange of the cross-member 24 associated with the clamping assembly 38 of which said clamp apparatus 42 forms part. The main body member 60 defines a medial plane M (see FIG. 1) which extends through the seat portion 66 and is arranged perpendicular thereto, and further defines a normal plane N which is aligned with the seat portion 66.

The pair of pad portions 62 comprise a first pad portion 62A and a second pad portion 62B, and preferably each take the form of a tubular member, formed of steel or the like, connected to a pivot arm 68 and having a central axis A extending substantially transversely to said respective pivot arm 68.

The mounting means or mechanism 63 is provided for mounting the pad portions 62 to the main body member 60 for movement between respective closed positions and respective open positions. In the closed positions, shown in FIG. 6, the pad portions 62 are located beyond the seat portion or terminus 66 of the main body member 60, on opposite sides of and in spaced relation to the medial plane M and in spaced, substantially equidistant relation to the normal plane N. In such configuration, the pad portions 62 define, in combination with the seat portion 66, a groove 67 of substantially inverted tee-shaped cross section through which the second flange 28 and the web 30 of a cross-member 24 can extend. In the open positions, shown in FIG. 7, the first pad portion 62A is disposed, relative to its respective closed position, in a direction away from the normal plane N and from the medial plane M, and the second pad portion 62B is disposed, relative to its respective closed position, in a direction away from the normal plane N and from the medial plane M, so as to permit the clamp apparatus to be positioned beneath the undercarriage and lifted into position for subsequent clamping. In FIG. 8, a clamp apparatus is shown about to be clamped about an I-beam.

In FIG. 4, the clamp apparatus 42 is shown clamped to an I-beam. The pad members 62 are disposed on and bear against opposite sides of the web 30, the seat portion 66 bears against the underside of the second flange 28, and the pad portions 62 bear against the top surface of the second flange 28, thereby to grip the cross-member 24.

Figure 7:
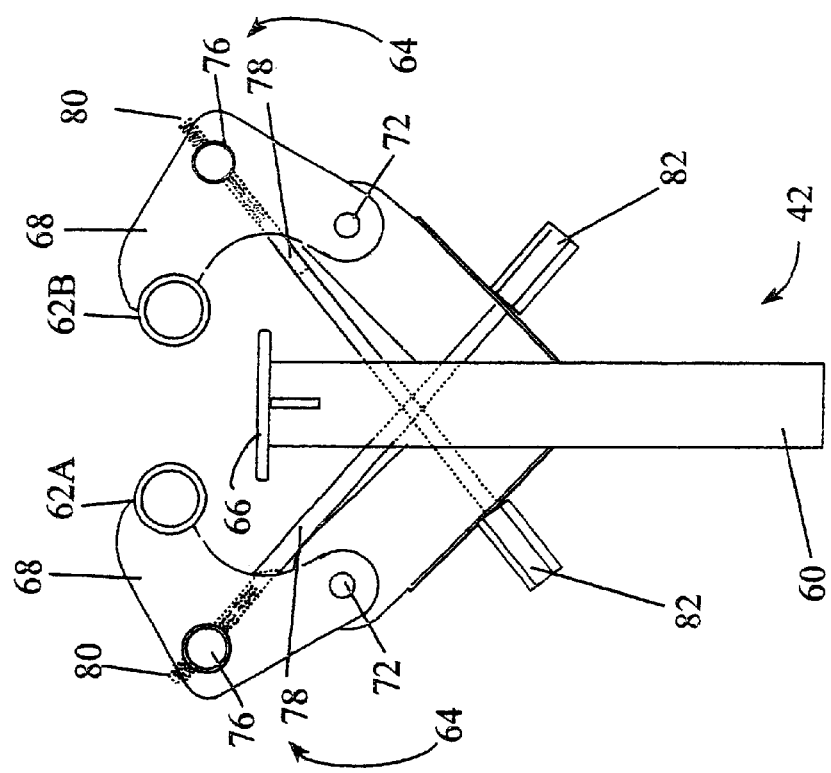
FIG. 7 is a view similar to FIG. 6, showing the clamp apparatus with the pad portions thereof in their respective open positions.
Figure 6:
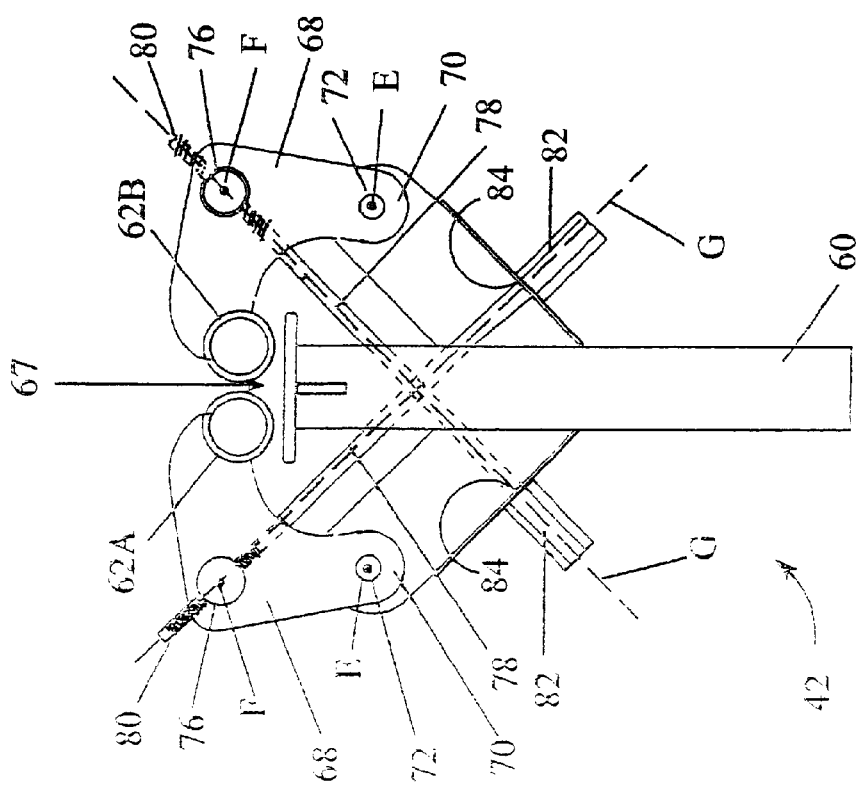
FIG. 6 is side elevational view of a clamp apparatus according to a preferred embodiment of the present invention, shown with the pad portions thereof in their respective closed positions.
Figure 8:
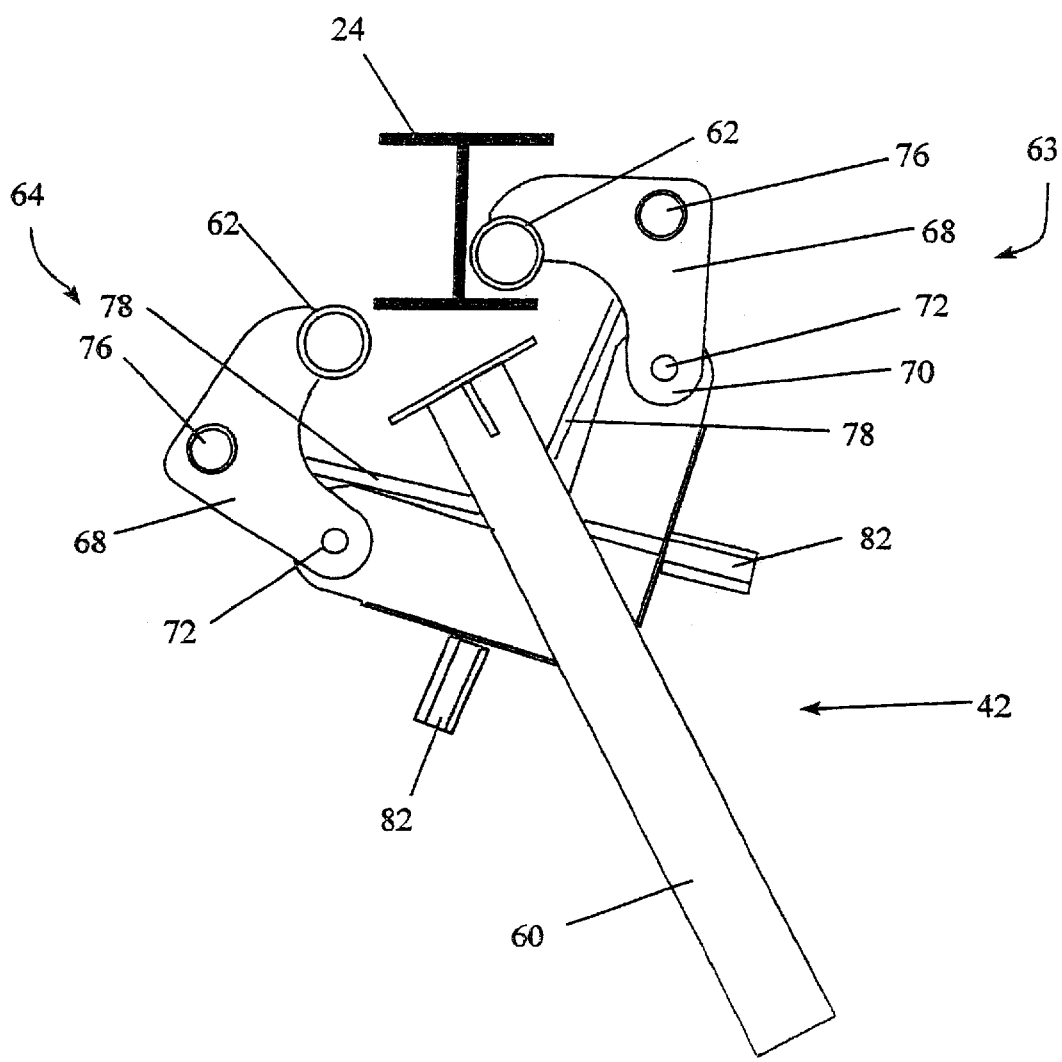
FIG. 8 is a view similar to FIG. 7, showing the clamp apparatus about to be clamped about an I-beam.

As indicated in FIGS. 6, 7 and 8, the preferred mounting means or mechanism 63 comprises a pivot arm 68 rigidly extending from each pad portion 62 to a pivot arm end 70. The end 70 is mounted by a pivot pin 72 to the main body member 60 for rotation of the pivot arm 68 about a respective pivot axis E arranged substantially parallel to the medial plane M and to the normal plane N.

In the preferred embodiment illustrated, the actuation mechanism 64 includes a coupler 76 mounted to each pivot arm 68 for rotation about a rotation axis F substantially parallel to the pivot axis E. Also provided is a shaft 78 which extends between the coupler 76 and the main body member 60 and is mounted to both for rotation about a shaft axis G substantially normal to the rotation axis F, as indicated in FIG. 6. The shaft 78 is mounted to the coupler 76 by threads 80 such that rotation of the shaft 78 causes movement, in a direction parallel to the shaft axis G, of the coupler 76 relative to the main body member 60, thereby to affect a movement of the pivot arm 68 to which the coupler 76 is mounted. Handle device 82 in the form of a mechanically-grippable hexagon head formed at a free end 84 of the shaft 78 is also provided for effecting selective rotation of the shaft 78.

Figure 10:
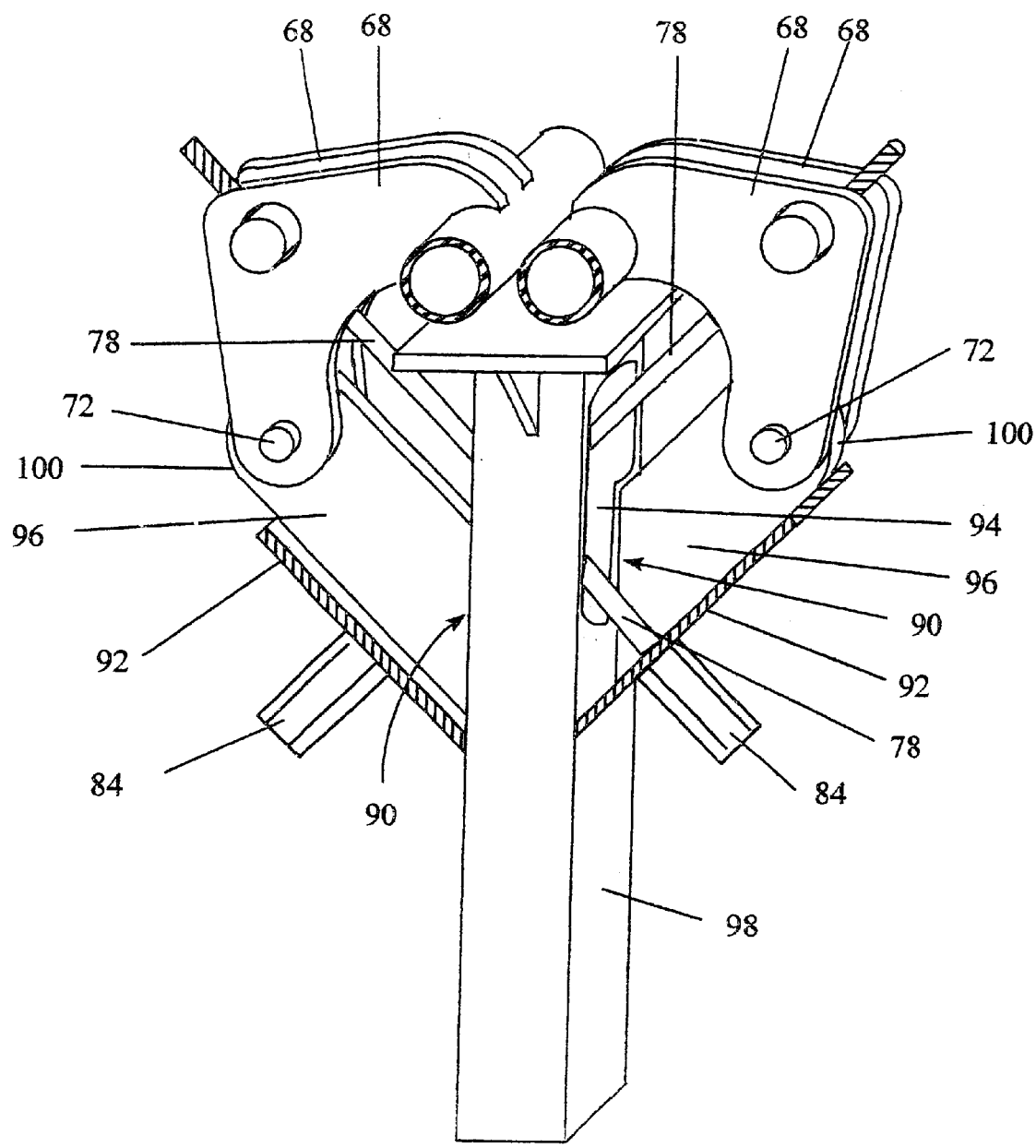
FIG. 10 is a perspective view of the clamp apparatus of FIG. 1.

Further details of the manner of construction of the clamp apparatus 42 are made apparent by FIG. 10, wherein it will be seen that the main body member 60 is preferably formed of a substantially square tube 98. A plug 110 is provided at the lower end of the tube 98. The threaded sockets 108, which receive bolts 46, are defined within the plugs 110. Portions of the tube 98 are cut away on opposite sides to form apertures 94 through which the shafts 78 extend.

Wing portions 96 extend from opposite sides of the tube 98, offset from one another, to provide clearance for the shafts 78. Each wing portion 96 has a proximal end 90 secured to the tube 98 by welding or the like, and extends therefrom to a distal end 100, to which a respective one of the pivot arms 68 is secured as aforedescribed. A flange 92 is rigidly secured to each wing 96, in perpendicular relation thereto, with the shafts 78 extending through the flanges 92 to their respective free ends 84, such that the flanges 92 form seats for the shaft heads 82.

The preferred method by which the system is employed comprises the step of rigidly connecting brace segments of the type previously discussed to one another, in substantially end-to-end relation, to provide a brace member that spans a number of cross-members on either side of the fracture calculated, using conventional methods, to provide sufficient rigidity to the trailer to avoid sagging having regard to, inter alia, the location of the "fracture", and the mechanical strength of the brace and clamp assemblies. Where necessary, the segments are connected with their axes in parallel, offset relation so as to generally follow the shape of the undercarriage.

A further step is to selectively, releasably connect clamping assemblies, preferably according to the preferred embodiment of the invention, to such of the cross-members of the trailer as have been calculated as aforesaid to provide sufficient rigidity to the trailer to avoid sagging.

As yet further steps, the brace member is positioned so as to extend beneath the undercarriage of the trailer, preferably between the pairs of clamp apparatus of the clamp assemblies, and, for each clamping assembly, a saddle member positioned beneath and urging the underside of the brace member towards the cross-member associated with said each clamping assembly and releasably connected to the pair of clamp apparatus is preferably provided, thereby to selectively, releasably connect the brace member to the clamping assemblies. Optionally, wooden blocking (not shown) may be wedged between the brace member and the cross-members to further limit the clearance and provide maximum rigidity to the structure.

Finally, various changes in size, shape and arrangement of parts can be made in respect of the bracing system and clamp apparatus of the present invention without departing from the spirit or scope of the invention. For example, only, while the saddle means of the preferred embodiment incorporates an ability to pivot or rotate, it could be possible to simply mount a rigid structural member, such as a bar with holes formed therein for the bolts, to the clamp apparatus. Further, whereas the mounting means of the preferred embodiment comprises a pivot arm, it is possible to deploy the pad portions at the end of telescopic arms, screw jacks or the like, to provide for linear movement between the open and closed positions.

Indeed, it is not strictly necessary that both pad portions be mounted for movement in respective directions away from both the medial plane and the normal plane; one pad portion, for example, the first pad portion, if mounted for linear movement substantially perpendicular to the seat portion, would provide similar utility to the clamp apparatus of the preferred embodiment. Similarly, whereas the actuation mechanism of the preferred embodiment comprises a hand-crankable screw apparatus, it is possible to automate the screw apparatus and also to utilize other conventional actuation apparatus, such as pneumatic cylinders, which are commonplace in the trucking industry, hydraulic cylinders or the like. Accordingly, it is to be understood that the scope of the present invention is limited only by the claims appended hereto, purposively construed.

What is claimed is:

1. In a disabled box trailer of the type having an exposed undercarriage comprising
   a plurality of laterally-extending I beam cross-members spaced-apart from one another in substantially side-by-side parallel relation, each cross-member having
   a first flange, a second flange spaced beneath and parallel to the first flange and
   a central web extending between and connecting the first flange and the second flange, said plurality of I-beam cross-members comprising a first grouping of I-beam cross-members collectively defining a first plane and a second grouping of I-beam cross-members collectively defining a second plane disposed in angular relation to the first plane, a bracing system comprising;
   a brace member disposed beneath and spanning between at least two of the cross-members of the first grouping and at least one of the cross-members of the second grouping and arranged substantially transversely to these cross-members;
   a clamping assembly for each of said at least two cross-members of the first grouping and associated therewith and for each of said at least one cross-member of the second grouping and associated therewith, each clamping assembly being selectively, releasably connected to its respective cross-member; and
   connection means selectively, releasably connecting the brace member to each clamping assembly to support said undercarriage as against sagging, for subsequent towing.

2. A box trailer according to claim 1, wherein each clamping assembly comprises a pair of clamp apparatus which are selectively, releasably connected to the cross-member associated with the clamping assembly of which said clamp apparatus together form part, and which are disposed on respective lateral sides of the brace member to restrain said brace member as against lateral movement.

3. A box trailer according to claim 2, wherein the connection means comprises, for each clamping assembly, a saddle member positioned beneath and urging an underside of the brace member towards the cross-member associated with the respective clamping assembly and releasably connected to the pair of clamp apparatus.

4. A box trailer according to claim 3, wherein the saddle member is releasably connected to the pair of clamp apparatus by bolts.

5. A box trailer according to claim 1, wherein the brace member comprises a plurality of brace segments rigidly, releasably connected to one another.

6. A box trailer according to claim 5, wherein each brace segment defines a longitudinal axis extending between respective ends and the brace segments are rigidly, releasably connectable to one another, in substantially end-to-end relation, with their respective longitudinal axes parallel and offset.

7. A method for bracing, for subsequent towing, a disabled box trailer of the type having an exposed undercarriage comprising a plurality of laterally-extending I-beam cross-members spaced-apart from one another in substantially side-by-side parallel relation, each cross-member having a first flange, a second flange spaced beneath and parallel to the first flange and a central web extending between and connecting the first flange and the second flange, said plurality of I-beam cross-members comprising a first grouping of I-beam cross-members collectively defining a first plane and a second grouping of I-beam cross-members collectively defining a second plane disposed in angular relation to the first plane, said method comprising the steps of:

(a) positioning a brace member beneath and spanning between at least two of the cross-members of the first grouping and at least one of the cross-members of the second grouping and in substantially transverse alignment to these cross-members;

(b) selectively, releasably connecting a clamping assembly to each of said at least two cross-members of the first grouping and to each of said at least one cross-members of the second grouping; and (c) selectively, releasably connecting the brace member to each clamping assembly to support said undercarriage as against sagging, for subsequent towing.

\* \* \* \* \*